United States Patent
Higurashi et al.

[11] Patent Number: 5,933,568
[45] Date of Patent: Aug. 3, 1999

[54] METHOD OF RECORDING AND REPRODUCING DIGITAL SIGNALS IN DIFFERENT SIGNAL TRANSMISSION MODES AND RECORDING MEDIUM THEREFOR

[75] Inventors: Seiji Higurashi, Fuchu; Takeo Ohishi; Mitsuo Harumatsu, both of Yokohama, all of Japan

[73] Assignee: Victor Company of Japan, Ltd., Yokohama, Japan

[21] Appl. No.: 08/611,165

[22] Filed: Mar. 5, 1996

[30] Foreign Application Priority Data

Mar. 6, 1995 [JP] Japan ................................. 7-072367

[51] Int. Cl.$^6$ ................................. H04N 5/91; G11B 5/09
[52] U.S. Cl. ................................. 386/68; 360/48; 386/81; 386/92
[58] Field of Search ................................. 360/39, 40, 48; 386/6, 40, 68, 81, 124, 7, 8, 33, 111, 112, 92

[56] References Cited

U.S. PATENT DOCUMENTS 5,335,328 8/1994 Dunn et al. ................................. 360/48
5,546,244 8/1996 Park et al. ................................. 360/53
5,579,183 11/1996 Van Gestel et al. ................................. 360/48

*Primary Examiner*—Aristotelis M. Psitos
*Assistant Examiner*—Regina Y. Neal
*Attorney, Agent, or Firm*—Jacobson, Price, Holman & Stern, PLLC

[57] ABSTRACT

A method for recording and reproducing digital signals in and from a recording medium is provided. The digital signals are to be recorded in any given k-th mode of N-kind digital signal transmission modes of mutually different packet sizes. Digital signals of $p_k$ packets with additional data are recorded on tracks of the recording medium in unit of $d_k$ data blocks. Data blocks of a multiple of the least common multiple R of the data block recording units of the respective digital signals of the N-kind digital signal transmission modes are recorded in each track. The data blocks recorded in the recording medium are reproduced. Here, N is a two or more natural number, k is 1 to N, and $p_k$ and $d_k$ are a natural number. There is a case where the digital signals are to be recorded in first and second digital signal transmission modes of two different packet sizes. In this case, in the first digital signal transmission mode, the digital signals of one packet in unit of two data blocks with the additional data are recorded. Further, in the second digital signal transmission mode, the digital signals of two packets in unit of three data blocks with the additional data are recorded. And, the data blocks of a multiple of six are recorded in each track on the recording medium.

16 Claims, 8 Drawing Sheets

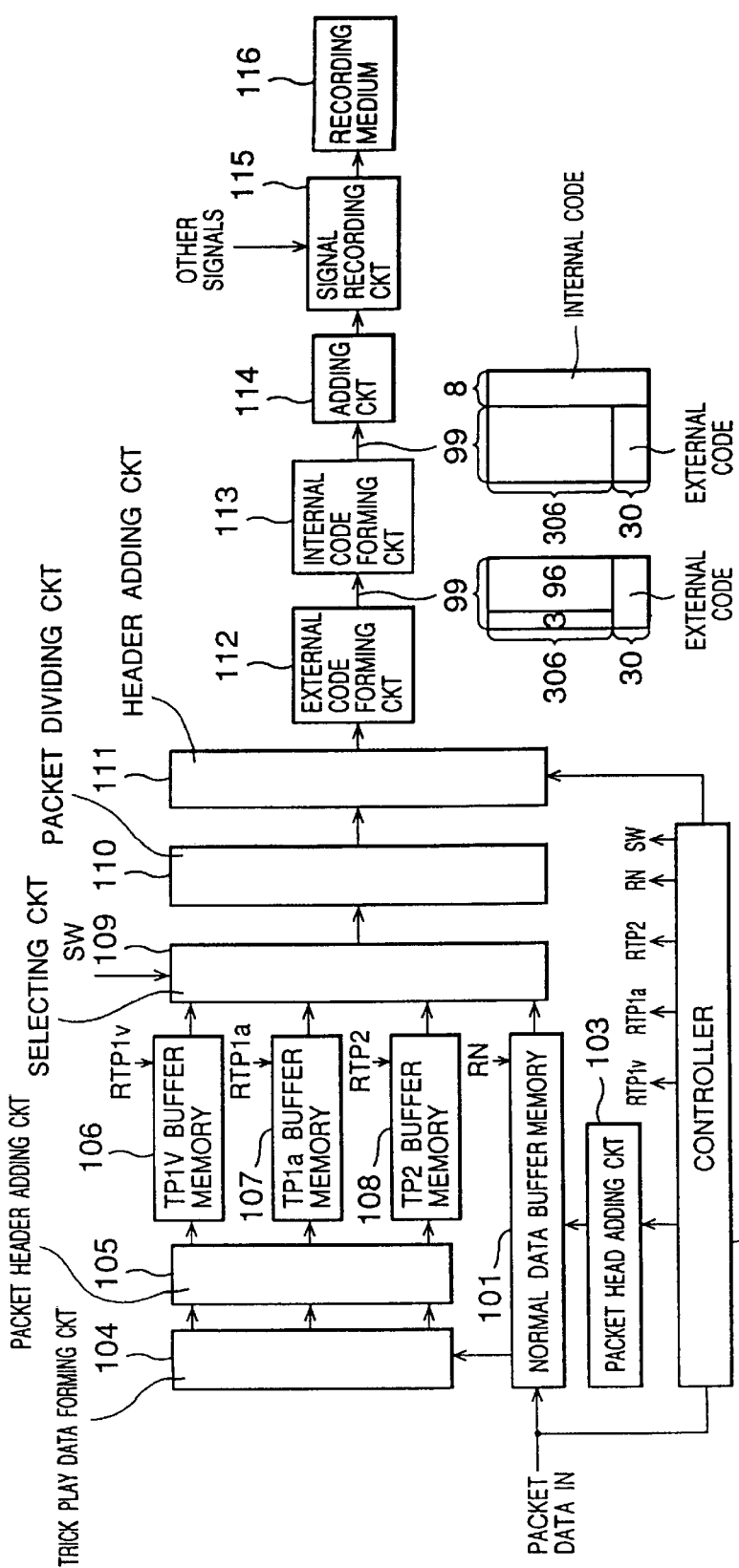

METHOD OF RECORDING AND REPRODUCING DIGITAL SIGNALS IN DIFFERENT SIGNAL TRANSMISSION MODES AND RECORDING MEDIUM THEREFOR

BACKGROUND OF THE INVENTION

1. Field of the Invention

The present invention relates to a digital signal recording and reproducing method and a recording medium used for the same method. More specifically, this invention relates to a digital signal recording and reproducing method for recording and reproducing packet digital signals in and from a recording medium. Further, this invention relates to a recording medium on which packet digital signals are recorded by the recording method.

2. Description of the Prior Art

In general, digital signals are recorded and reproduced in and from a recording medium in unit of data block. In this case, the data storing region of the data block is of fixed length. When the digital signals are packet signals, the digital signals have been so far recorded and reproduced by determining the packet length according to the size of the data storing region. Further, the digital signals have been recorded and reproduced by setting the track size (the number of data blocks on one track) to an optimum value.

Recently, various digital broadcasting television standards and other digital signal transmission standards of different packet sizes have been proposed. And, there is the case where digital signals of different packet sizes are recorded and reproduced by the same recording and reproducing apparatus in accordance with one physical track format.

In this case, the track size and the data block length may be optimum for one transmission standard. However, since only one physical track format is provided, the number of data blocks for constituting one track is not appropriate for the packet size of another transmission standard. A fraction is thus produced in the number of data blocks with decrease in recording efficiency. Further, when packet data are allocated to the data blocks of each track, the addressing and buffering operations are complicated.

To overcome these problems, in general, the digital signals are recorded and reproduced by use of a special recording and reproducing apparatus conforming to the respective standard. In this case, however, it is not economical to record and reproduce digital signals by use of only a dedicated recording and reproducing apparatus. Therefore it is desirable to record and reproduce digital signals of various standards of different packet sizes, respectively by use of the same single recording and reproducing apparatus.

SUMMARY OF THE INVENTION

With these problems in mind, therefore, it is an object of the present invention to provide a digital signal recording and reproducing method and a recording medium used for the method, which can record and reproduce digital signals of various standards of different packet sizes by use of a single recording and reproducing apparatus.

To achieve the object, the present invention provides a method for recording and reproducing digital signals in any given k-th mode of N-kind digital signal transmission modes of mutually different packet sizes in and from a recording medium, comprising the steps of: recording digital signals of $p_k$ packets with additional data on tracks of the recording medium in unit of $d_k$ data blocks; recording, in each track, data blocks of a multiple of the least common multiple R of the data block recording units of the respective digital signals of the N-kind digital signal transmission modes; and reproducing the data blocks recorded in the recording medium, wherein N is a two or more natural number, k is 1 to N, and $p_k$ and $d_k$ are a natural number.

It is preferable when the digital signals are to be recorded in first and second digital signal transmission modes of two different packet sizes: in the first digital signal transmission mode, to record the digital signals of one packet in unit of two data blocks with the additional data; in the second digital signal transmission mode, to record the digital signals of two packets in unit of three data blocks with the additional data; and to record the data blocks of a multiple of six in each track on the recording medium.

It is preferable when the digital signals of the $p_k$ packets are to be recorded in the $d_k$ data blocks with the additional data: to record a counted value indicating the order of the $p_k$ packets at least as the additional data in each of the $d_k$ data block; and to reproduce the counted value to detect the order of the $p_k$ packets. Further, it is preferable to record the counted value in a predetermined area other than an area for the digital signals in each data block.

It is preferable when normal reproducing data series of recorded digital signals to be reproduced at the same speed as when recorded, and n-kind trick playing data series of recorded digital signals to be reproduced at speeds different from when recorded are mixed with each other and to be recorded in data blocks of a multiple of the least common multiple R in each track: to arrange and record the n-kind trick playing data series at a specific position in a track at specific track periods; to set a first sum total number of the data blocks of the normal reproducing data series in tracks whose number is the least common multiple T of each track period to a multiple of the least common multiple R; and to set a second sum total number of the data blocks of the trick playing data series for each kind in tracks whose number is the least common multiple T to a multiple of the least common multiple R.

Further, it is preferable to set the first sum total to a number of a multiple of six; and to set the second sum total to another number of a multiple of six for each kind.

Further, it is preferable to set a sum total number of the data blocks of the normal reproducing data series in any given single track of tracks whose number is the least common multiple T to a multiple of the least common multiple R for recording.

Further, it is preferable to set the least common multiple R to six.

It is also preferable when normal reproducing data series of recorded digital signals to be reproduced at the same speed as when recorded, and n-kind trick playing data series of recorded digital signals to be reproduced at speeds different from when recorded are mixed with each other and to be recorded in data blocks of a multiple of the least common multiple R in each track: to arrange and record the n-kind trick playing data series at specific positions in a track at specific track periods; to set a first sum total number of the data blocks of the normal reproducing data series in each track to a multiple of the least common multiple R; and to set a second sum total number of the data blocks of the trick playing data series for each kind in each track to a multiple of the least common multiple R.

It is further preferable to set the first sum total to a number of a multiple of six; and to set the second sum total a number of a multiple of six for each kind.

The invention further provides a recording medium, comprising: sequential recording sections; and data blocks recorded in the recording sections, each data block at least having a data storing region, wherein digital signals of $p_k$ packets of any given k-th mode of N-kind digital signal transmission modes of mutually different packet sizes are recorded in data storing regions of $d_k$ data blocks with additional data, and the data blocks of a multiple of the least common multiple R of data block recording units $d_1$ to $d_N$ of the respective digital signals of the N-kind digital signal transmission modes are recorded for each recording section, where N is a two or more natural number, k is 1 to N, and $p_k$ and $d_k$ are a natural number.

It is preferable when digital signals of normal reproducing data series to be reproduced at the same speed as when recorded and n-kind trick playing data series to be reproduced at speeds different from when recorded are mixed in a data storing region having data blocks whose number is a multiple of the least common multiple R for each recording section that the n-kind trick playing data series are arranged and recorded at a specific fixed position in the recording section at a predetermined fixed recording section period, a sum total number of the data blocks of the normal reproducing data series in the recording sections whose number is the least common multiple T of the respective recording section periods is a multiple of the least common multiple R, and a sum total number of the data blocks of the trick playing data series for each kind in the recording sections whose number is the least common multiple T is set to a multiple of the least common multiple R for recording.

The invention further provides a method for recording digital signals in any given k-th mode of N-kind digital signal transmission modes of mutually different packet sizes in a recording medium, comprising the steps of: recording digital signals of $p_k$ packets with additional data on tracks of the recording medium in unit of $d_k$ of data blocks; recording digital signals of $p_k$ packets on the recording medium; and recording, in each track, data blocks of a multiple of the least common multiple R of the data block recording units of the respective digital signals of the N-kind digital signal transmission modes, wherein N is a two or more natural number, k is 1 to N, and $p_k$ and $d_k$ are a natural number.

It is preferable when normal reproducing data series of recorded digital signals to be reproduced at the same speed as when recorded, and n-kind trick playing data series of recorded digital signals to be reproduced at speeds different from when recorded are mixed with each other and to be recorded in data blocks of a multiple of the least common multiple R in each track: to arrange and record the n-kind trick playing data series at a specific position in a track at specific track periods; to set a first sum total number of the data blocks of the normal reproducing data series in tracks whose number is the least common multiple T of each track period to a multiple of the least common multiple R; and to set a second sum total number of the data blocks of the trick playing data series for each kind in tracks whose number is the least common multiple T to a multiple of the least common multiple R.

The invention further provides a method for reproducing digital signals in any given k-th mode of N-kind digital signal transmission modes of mutually different packet sizes from a recording medium, comprising the steps of: reproducing additional data recorded with digital signals of $p_k$ packets on tracks of the recording medium in unit of $d_k$ data blocks, wherein N is a two or more natural number, k is 1 to N, and $p_k$ and $d_k$ are a natural number; detecting arrival times of the $p_k$ packets by referring to the reproducing additional data; generating control signals on the basis of the detected arrival times; dividing the $p_k$ packets in unit of a specific number of packets in response to one of the control signals; and selecting the divided $p_k$ packets in the order of the arrival times; and outputting the digital signals in the selected packet.

It is preferable when normal reproducing data series of recorded digital signals to be reproduced at the same speed as when recorded, and n-kind trick playing data series of recorded digital signals to be reproduced at speeds different from when recorded are mixed with each other and recorded in data blocks of a multiple of the least common multiple R in each track: to generate control signals corresponding to the normal reproducing data series and n-kind trick playing data series on the basis of the detected arrival times; to divide the $p_k$ packets according to the normal reproducing data series and n-kind trick playing data series; and to select the normal reproducing data series and n-kind trick playing data series in the order of the arrival times.

BRIEF DESCRIPTION OF THE DRAWINGS

FIG. 9 is a block diagram showing an embodiment of the recording apparatus for realizing the method according to the present invention;

FIGS. 10A and 10B are illustrations for assistance in explaining data format stored in buffer memories in the first and second transmission modes, respectively.

DETAILED DESCRIPTION OF THE PREFERRED EMBODIMENTS

Preferred embodiments of the present invention will be described hereinbelow with reference to the attached drawings.

Each embodiment employs a helical scanning type magnetic recording and reproducing apparatus (VTR) for recording digital signals on tracks of a magnetic tape. In this apparatus, digital signals are recorded and reproduced in and from the magnetic tape with two rotary heads. The two rotary heads are so mounted on a rotating body that they face each other with two mutually different azimuth angles of 180 degrees. Further, the magnetic tape is wound on and around an outside surface of the rotating body obliquely at about 180 degree rotational angle and moved at a constant travel speed.

Each track is formed by arranging a plurality of data area of a constant quantity in accordance with the scanning operation of the rotary heads. The data area of a constant quantity is referred to as sync block which corresponds to the afore-mentioned data block.

Figure 1:
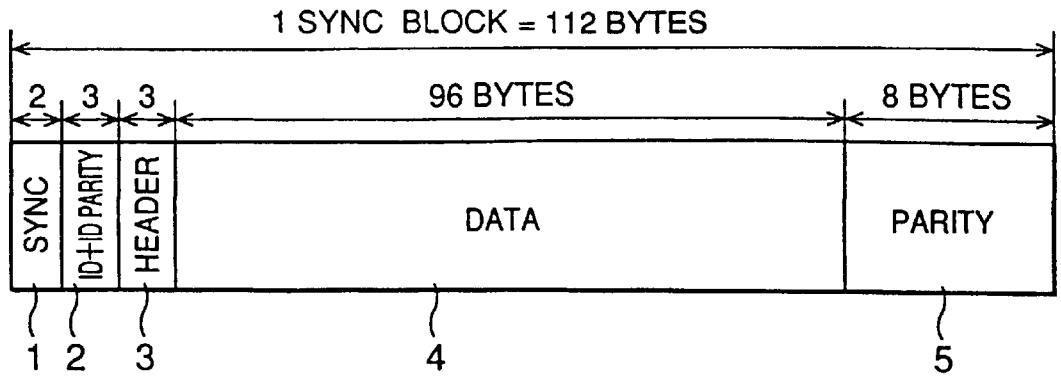
FIG. 1 is an illustration showing a first embodiment of a sync block format recorded and reproduced by the recording and reproducing method according to the present invention.

FIG. 1 shows a first embodiment of this sync block format. As shown, the sync block is of 112 bytes in total. And, the sync block consists of, in time serial manner, a two-byte synchronous signal (Sync) region 1 for sync block reproduction, a three-byte address data (ID) region 2 (with an ID parity), a three-byte header storing region 3 for storing various data, a 96-byte substantial data storing area 4, and an eight-byte parity region 5 for correcting an error of the sync block data. Here, substantial data is the data, such as video and audio signals to be recorded.

In this embodiment, as an example, digital signals of two different packet sizes of two different transmission modes can be recorded and reproduced with interchangeability. In more detail, the first transmission mode is the transport packet (TP) transmission mode of MPEG2 (moving picture experts group 2) in which the packet size of digital signals is 188 bytes. And, the second transmission mode is the digital satellite system (DSS) packet transmission mode in which the packet size of digital signals is 140-byte.

Figure 2:
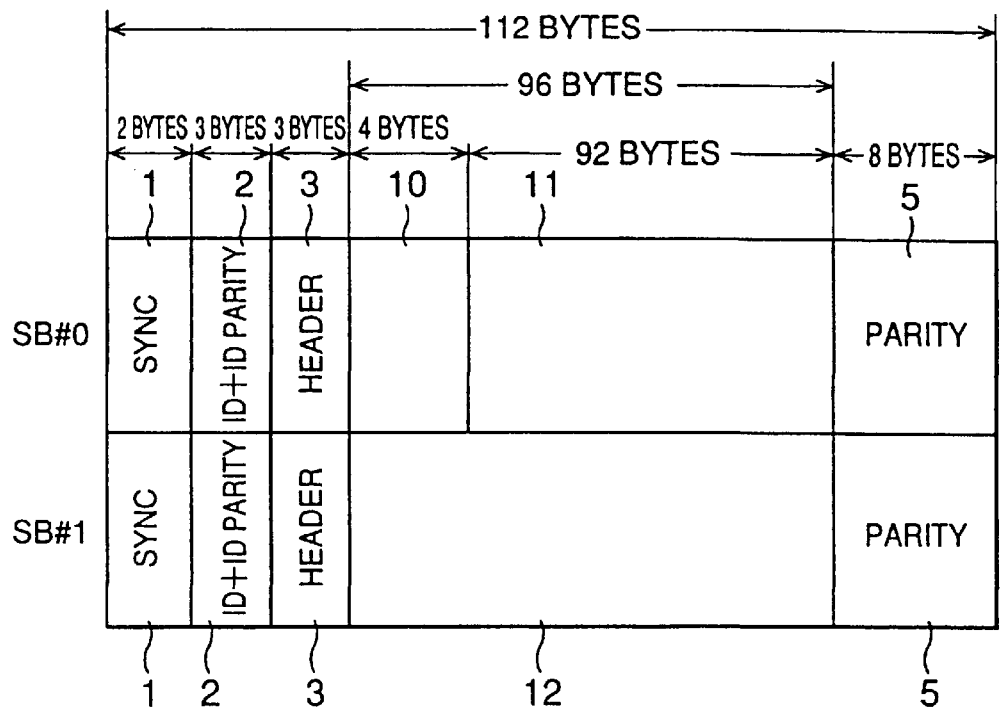
FIG. 2 is an illustration showing a construction of a sync block used when digital signals are recorded in a first transmission mode according to the present invention.

In the case of the digital signal recording operation in the first transmission mode (MPEG2-TP mode), digital signals are recorded and reproduced repeatedly in unit of two sync blocks SB#0 and SB#1, as shown in FIG. 2. The two blocks SB#0 and SB#1 are arranged in parallel in FIG. 2 for better understanding of the first embodiment. Actually, the blocks SB#0 and SB#1 are serially recorded and reproduced.

In more detail, in the sync block SB#0 shown in FIG. 2, the region of the 96-byte data storing area 4 shown in FIG. 1 consists a four-byte additional data storing area 10 and a 92-byte data storing area 11. The additional data storing area 10 is provided for recording and reproducing additional data (e.g., a packet arrival time, and the other data) of one packet (188 bytes). And, the data storing area 11 is provided for recording and reproducing 92-byte data beginning from the head of one 188-byte packet.

Further, in the (serially) adjacent sync block SB#1, the 96-byte data storing area 4 shown in FIG. 1 is constructed as a 96-byte data storing area 12, as it is, for recording and reproducing 96-byte data remaining in one packet.

Figure 3:
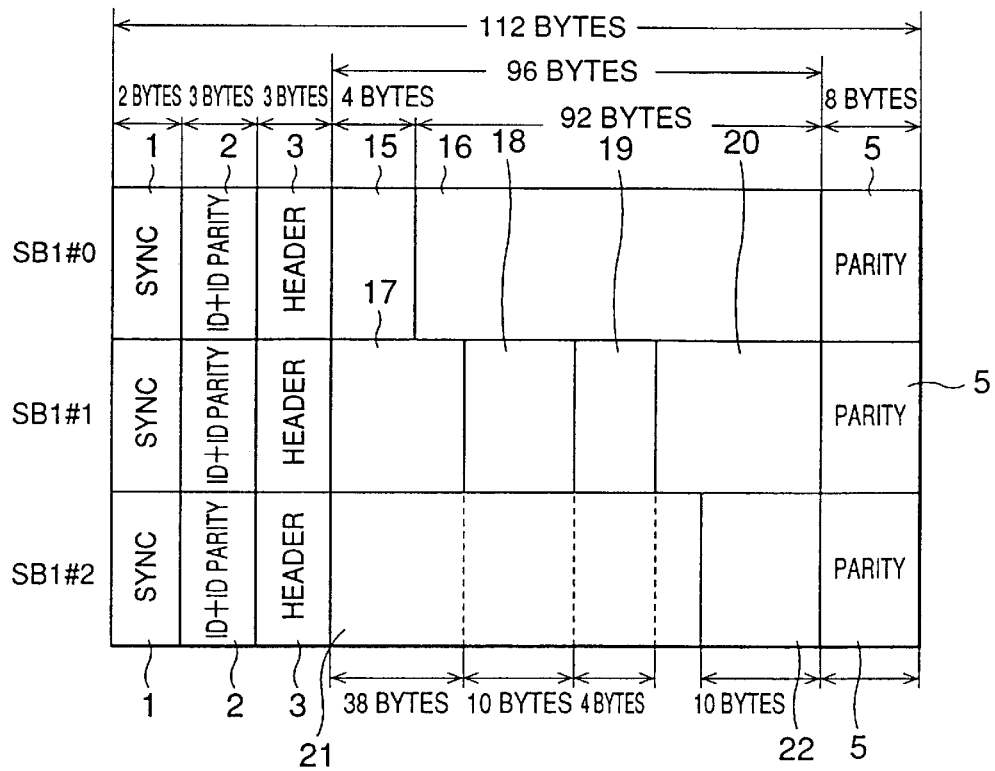
FIG. 3 is an illustration showing a construction of a sync block used when digital signals are recorded in a second transmission mode according to the present invention.

Further, in the case of the digital signal recording operation in the second transmission mode (DSS mode), since one packet size is 130 bytes, the packet size is increased to 140 bytes by adding ten-byte data (dummy or additional data) to the 130 bytes. Here, this 140-byte packet is referred to as one packet, for convenience. Therefore, digital signals are recorded and reproduced repeatedly in unit of three sync blocks SB1#0, SB1#1, and SB1#2, as shown in FIG. 3. The three blocks SB1#0, SB1#1, and SB1#2 are arranged in parallel in FIG. 3 for better understanding of the first embodiment. Actually, the blocks SB1#0, SB1#1, and SB1#2 are serially recorded and reproduced.

Further, in the sync block SB1#0 shown in FIG. 3, the region of the 96-byte data storing area 4 shown in FIG. 1 consists of a four-byte additional data storing area 15, and a 92-byte data storing area 16. The additional data storing area 15 is provided for recording and reproducing a piece of additional data of the first packet of two packets (2×140=280 bytes). The additional data is one of two piece of additional data (e.g., a packet arrival time, and the other data) for the two packets. And, the 92-byte data storing area 16 is provided for recording and reproducing 92-byte data beginning from the head of the first 140-byte packet.

Further, in the (serially) adjacent sync block SB1#1, the 96-byte data storing area 4 shown in FIG. 1 consists of 38-byte data storing area 17, a ten-byte data storing area 18, four-byte additional data storing area 19, and a 44-byte data storing area 20. The 38-byte data storing area 17 is provided for recording and reproducing the remaining 38-byte data of the first 140-byte packet. Because the 92-byte data beginning from the head of the first 140-byte packet is stored in the 92-byte data storing area 16 of the sync bock SB1#1. The ten-byte data storing area 18 is provided for storing the ten-byte data (the dummy data or the additional data). The four-byte additional data storing area 19 is provided for recording and reproducing additional data (e.g., a packet arrival time, and the other data) of the second 140-byte packet of the two packets (2×140=280 bytes). And, the 44-byte data storing area 20 is provided for recording and reproducing 44-byte data beginning from the head of the second 140-byte packet. Further, in the (serially) adjacent sync block SB1#2, the 96-byte data storing area 4 shown in FIG. 1 consists of a 86-byte data storing area 21 and a ten-byte data storing area 22. The 86-byte data storing area 21 is provided for recording and reproducing the remaining 86-byte data of the second 140-byte packet. And, the ten-byte data storing area 22 is provided for storing 10-byte data (the dummy data or the additional data).

As described above, in this first embodiment, in the case of the digital signal recording operation in the second transmission mode (the maximum packet size is 140 bytes), at least 130-byte packet to be transmitted of the 140-bytes is first recorded as shown in FIG. 3. It is thus possible to read these data immediately after the 4-byte additional data from a buffer memory.

Here, the track format is decided under consideration of the relationship among the recording wavelength, the necessary recording capacity of the major data, the necessary recording capacity of the other data, the lock area of a phase synchronous circuit (PLL circuit), the editing margin area, etc. Among these, when the necessary recording capacity of the major data is decided, it is necessary to construct the data sync blocks of a multiple of six sync blocks. Here, the six sync blocks is the least common multiple of the two sync blocks (which is a recording and reproducing unit of the first transmission mode) and the three sync blocks (which is a recording and reproducing unit of the second transmission mode).

Figure 4:
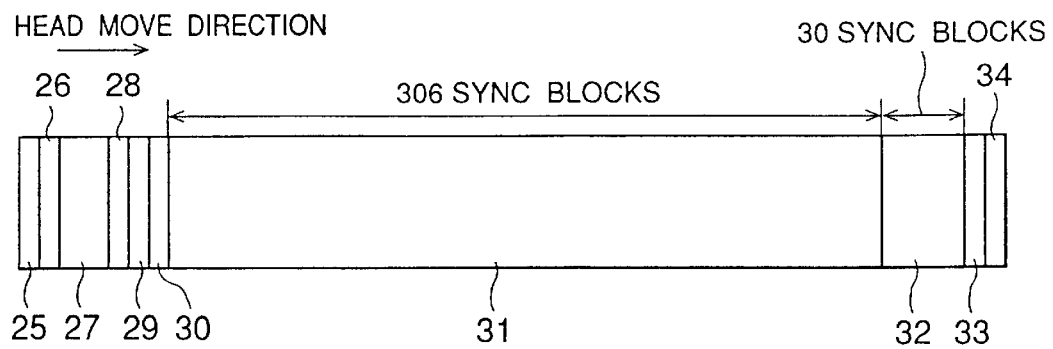
FIG. 4 is an illustration showing one video track format of the first embodiment according to the present invention.

FIG. 4 shows one video track format of the present embodiment. As shown, a single track consists of a margin region 25, a preamble region 26, a sub-code region 27, a postamble region 28, an IBG (Inter Block Gap) region 29, a preamble region 30, a data region 31, an error correcting code region 32, a postamble region 33, and a margin region 34.

Here, the data region 31 and the error correcting region 32 for constituting the major data area. Among them, the data region 31 must satisfy the above-mentioned condition; that is, the data region 31 is set to 306 sync blocks which is a multiple of six sync blocks. Further, the error correcting region 32 is a region in which external error correcting codes (C3 codes) are recorded, which is set to 30 sync blocks.

As described above, in the first transmission mode, since one packet of the digital signals is recorded in unit of two sync blocks, 153 packets (=306/2×1) can be recorded and reproduced in and from a single track. Further, in the second transmission mode, since two packets of the digital signals are recorded in unit of three sync blocks, 204 packets (=306/3×2) can be recorded and reproduced in and from a single track.

As described above, in the present embodiment, since the data blocks in one track can be utilized just enough neither too much nor too less for both the first and second transmission modes, the recording efficiency is high. Further, the one-packet data will not extend over the two tracks. Thus, the packet processing can be completed in one track, the utilization efficiency of the buffer memory is high, and further the addressing can be made easily.

In the two-sync block construction as shown in FIG. 2 for the first transmission mode, one packet for this mode is recorded in unit of two sync blocks. Whether a portion of a packet recorded in one sync block is the former part of the packet or the latter part thereof can be judged by the following method: when a sync block number recorded in an ID region is an even number, it is judged that the potion of a packet recorded in one sync block is the former part of the packet, whereas when the sync number is an odd number, it is the latter part.

Contrary to this, in the two-sync block construction as shown in FIG. 3 for the second transmission mode, two packets for this mode is recorded in unit of three sync blocks. Judgement as to which portion of which packet is recorded in one sync block is made as follows: First, a sync number recorded in an ID region is divided by "3". If the surplus is "0", it is judged that the first portion is recorded in one sync block. If "1", the second portion, and, if "2", the third portion. The locations of the sync blocks in which portions of the packet are recorded in the second transmission mode are specified by the first, second, and third portions. Thus, the other portions cannot be used when one sync block is required for the other data. This results in only the recording in unit of two or three sync blocks being possible.

The following sync block formats are provided for recording sync block numbers in unit of packet division.

Figure 5:
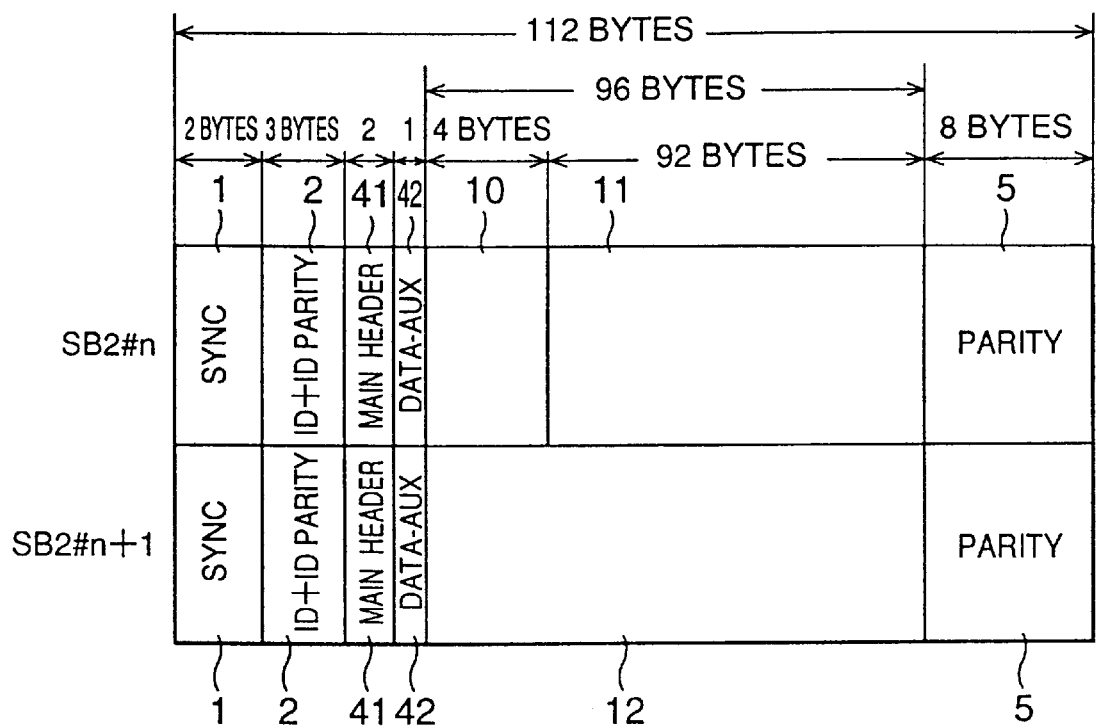
FIG. 5 is an illustration showing another construction of a sync block used when digital signals are recorded in a first transmission mode according to the present invention.

FIG. 5 shows another sync block format for digital signal recording in the first (MPEG2-TP) transmission mode. In FIG. 5, the same reference numerals are assigned to the components corresponding to those in FIG. 2. Sync blocks SB2#n and SB2#n+1 are arranged in parallel in FIG. 5 for better understanding of the embodiment. Actually, these blocks are serially recorded and reproduced.

In the format of FIG. 5, the three-byte header storing region 3 in FIG. 2 is divided into a two-byte main header region 41 and a one-byte data auxiliary region 42. The least significant two bits of the first byte of a main header recorded in the main header region 41 is used for counting divided sync blocks. In other words, the least significant two bits "00" and "01" of the first byte of the recorded main header are assigned to the first sync block SB2#n and the second sync block SB2#n+1, respectively.

Figure 6:
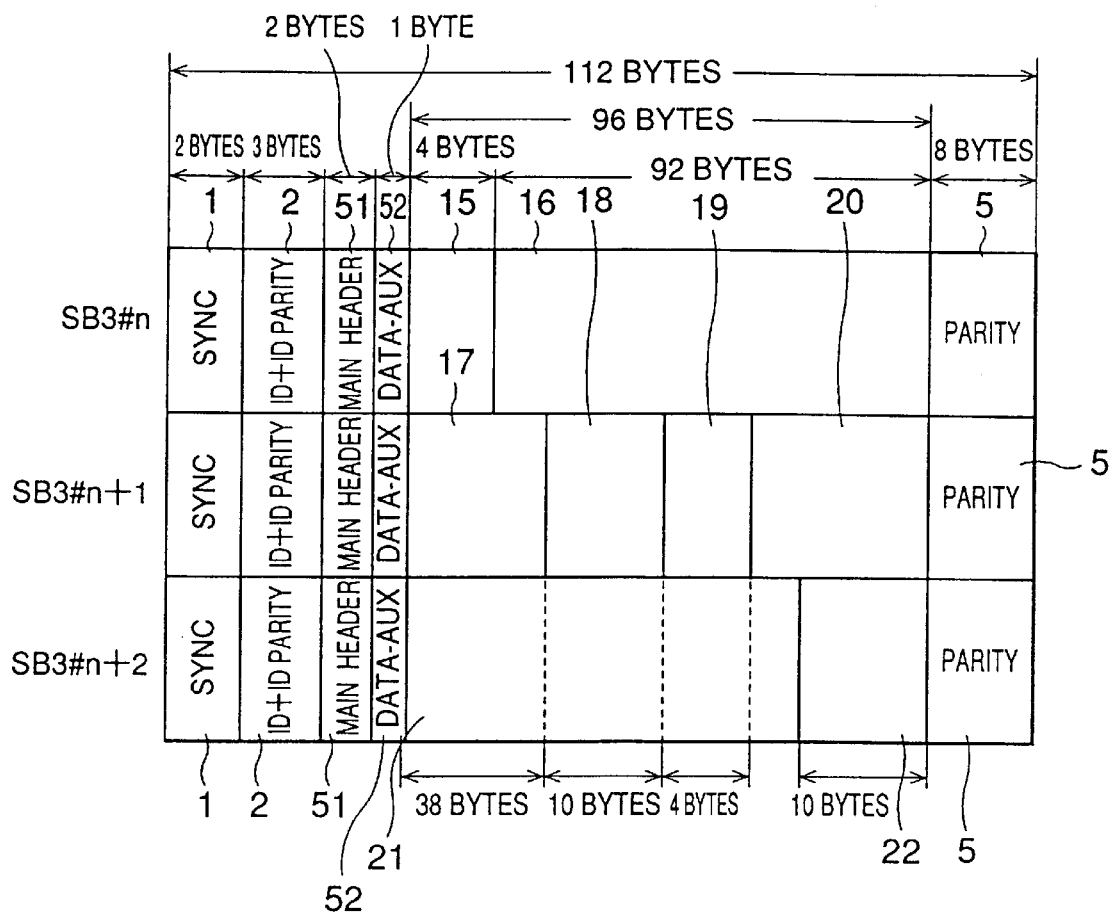
FIG. 6 is an illustration showing another construction of a sync block used when digital signals are recorded in a second transmission mode according to the present invention.

Next, FIG. 6 shows still another sync block format for digital signal recording in the second (DSS) transmission mode. In FIG. 6, the same reference numerals are assigned to the components corresponding to those in FIG. 3. Also, in the figure, sync blocks SB3#n, SB3#n+1, and SB3#n+2 are arranged in parallel in FIG. 6 for better understanding of the embodiment. Actually, these blocks are serially recorded and reproduced.

In the format of FIG. 6, the three-byte header storing region 3 in FIG. 3 is divided into a two-byte main header region 51 and a one-byte data auxiliary region 52. The least significant two bits of the first byte of a main header recorded in the main header region 51 is used for counting divided sync blocks. In other words, the least significant two bits "00", "01", and "10" of the first byte of the recorded main header are assigned to the first sync block SB3#n, the second sync block SB3#n+1, and the third sync block SB3#n+2, respectively.

As described above, by counting the divided sync blocks, it is detected what kinds of data are recorded in the divided sync blocks. In the digital signal recording in the second transmission mode, detection on the divided portions of a packet can be made using the least significant two bits of the first byte of the main header without a dividing circuit, etc. In this case, a counted value obtained using the least significant two bits of the first byte of the main header has an initial value "00" and is assigned independently of a sync block number (ID). The number of sync blocks of the other data to be recorded has no limitation between the divided sync blocks.

Figure 7:
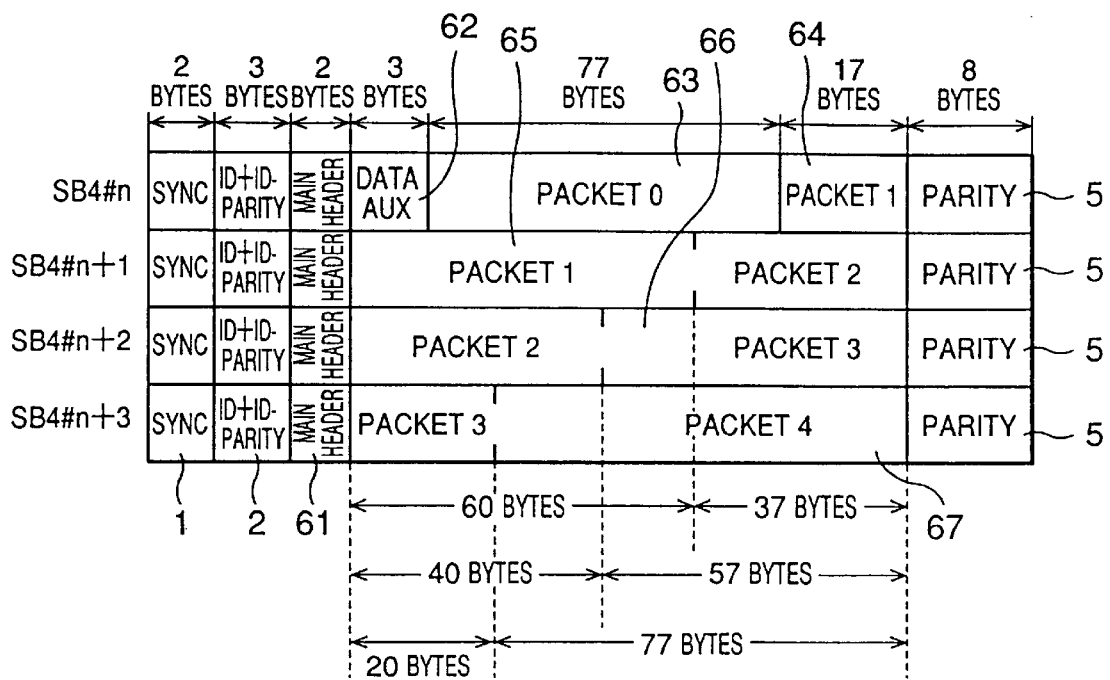
FIG. 7 is an illustration showing another construction of a sync block used when digital signals are recorded according to the present invention.

FIG. 7 shows still another sync block format for digital signal recording. In FIG. 7, the same reference numerals are assigned to the components corresponding to those in FIG. 3. Also, in the figure, sync blocks SB4#n, SB4#n+1, SB4#n+2, and SB4#n+3 are arranged in parallel in FIG. 7 for better understanding of the embodiment. Actually, these blocks are serially recorded and reproduced.

Each sync block in FIG. 7 is provided with a 97-byte data storing region following to the main header region. More in detail, the first sync block SB4#n is provided with a three-byte data auxiliary region 62, a 77-byte packet storing region 63 for a packet 0, and a 17-byte packet storing region 64 for the beginning 17 bytes of a packet 1. The second sync block SB4#n+1 is provided with a 97-byte packet storing region 65 for the remaining 60 bytes of the packet 1 and the beginning 37 bytes of a packet 2. The third sync block SB4#n+2 is provided with a 97-byte packet stroing region 66 for the remaining 40 bytes of the packet 2 and the beginning 57 bytes of a packet 3. Further, the fourth sync block SB4#n+3 is provided with a 97-byte packet stroing region 67 for the remaining 20 bytes of the packet 3 and the all 77 bytes of a packet 4.

As described, in FIG. 7, five packets 0 to 4 (each is 77 bytes) are recorded in unit of four sync blocks. The least significant 2 bits of the first byte of a main header recorded in each main header region 61 is used for counting divided sync blocks. In this case, the least significant two bits "00", "01", and "11" of the first byte of the main header are assigned to the sync blocks SB4#n, SB4#n+1, SB4#n+2, respectively.

The counted values of the divided sync blocks are not necessarily limited to the first byte of the main header. Further, the number of bit is not necessarily limited to two bits, may be more.

The second embodiment of the present invention will be described hereinbelow. In this embodiment, the digital signals of the first transmission and/or the second transmission mode are recorded and reproduced in and from a recording medium on the basis of the number of sync blocks which is a multiple of six for each track by the helical scanning type magnetic recording and reproducing apparatus. This is the same as in the first embodiment. However, this second embodiment is different from the first embodiment in that there are provided the normal reproducing data series NML and two trick playing data series TP1 and TP2. In the normal reproducing data series NML, video signals and audio signals are both reproduced at the normal speed (the same speed as the recording speed). In the trick playing data series, for example, video signals and audio signals are both reproduced at two speeds different from the recording speed. Here, the two speeds are three-time and nine-time reproduction speeds.

The trick playing data series TP1 is a data series of the three-time reproduction speed and consists of a data series TP1v for video signals and a data series TP1a for audio signals. Further, the trick playing data series TP2 is a data series of the nine-time reproduction speed and has a data series for video signals.

Figure 8:
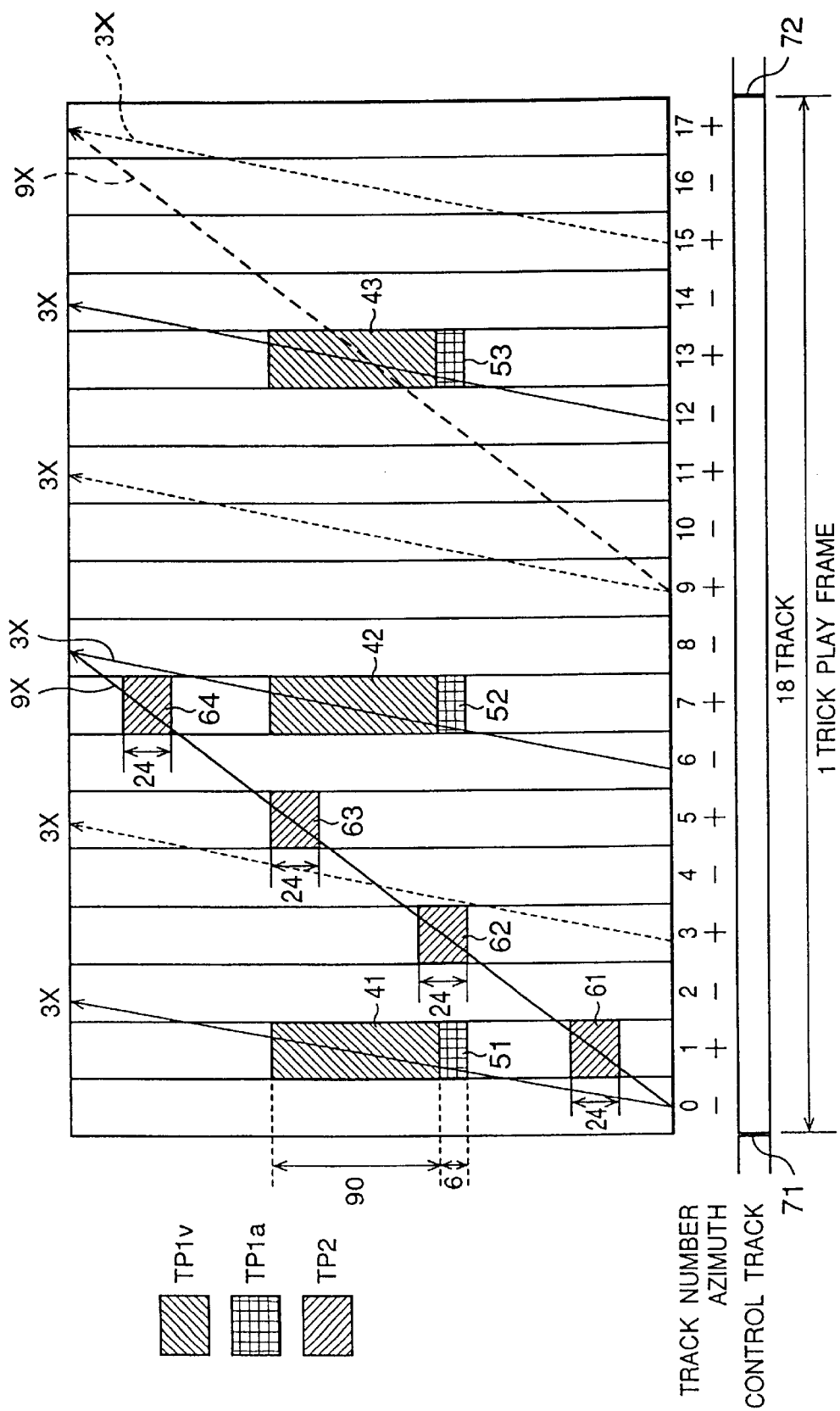
FIG. 8 is an illustration for assistance in explaining the track patterns and the head scanning patterns in trick plays of a second embodiment of the present invention.

FIG. 8 shows a track pattern of the second embodiment. As shown by squares 41 to 43 and 51 to 53, the data series TP1v and the data series TP1a are recorded on track numbers [1], [7] and [13] at the six-track period. These data series are recorded by a rotary head of the same-azimuth angle. Further, as shown by squares 61 to 64, the data series TP2 are recorded on track numbers [1], [3], [5] and [7] but not recorded in the succeeding ten tracks. That is, the data series TP2 are recorded at the 18-track period. These data are also recorded by the rotary head of the same-azimuth angle.

Further, as shown in FIG. 8, in the trick playing, the trick playing data series TP1v, TP1a and TP2 are recorded in such areas that they are securely scanned when the rotary head crosses the tracks obliquely. Further, markers 71 and 72 are recorded on a control track at the 18-track period. Further, in FIG. 8, the solid line arrows indicate a scanning locus of the rotary head having a positive azimuth angle in the three-time or the nine-time speed reproduction. And, the dashed line arrows indicate a scanning pattern of the rotary head having a negative azimuth angle in the three-time or the nine-time speed reproduction.

In this embodiment, the number of data blocks (the number of sync blocks) of each trick playing data to be set on a single track is determined so as to be a multiple of six for each data series. In more detail, the capacitance per reproduction burst is set to 90 (=6×15) sync blocks in the data series TP1v, to six (=6×1) sync blocks in the data series TP1a, and to 24 (=6×4) sync blocks in the data series TP2.

The number of bursts reproduced by the rotary head for each revolution of the rotating body (on which the rotary head is mounted) is one burst in both the data series TP1v and TP1a. This is understood by the head scanning pattern during the three-time speed reproduction as shown by the arrows 3×, and the nine-time speed reproduction as shown by the arrows 9×. Further, the number of bursts reproduced by the rotary head for each revolution of the rotating body is four bursts in the data series TP2. This is understood by the head scanning pattern during the nine-time speed reproduction as shown by the arrows 9×. Therefore, the number of the sync blocks reproduced by the rotary head for each revolution of the rotating body is 90 (=90×1) sync blocks in the data series TP1v, six (=6×1) sync blocks in the data series TP1a, and 96 (=24×4) sync blocks in the data series TP2.

In FIG. 8, the track pattern in one trick play frame consists of tracks of four kinds, such as: a first track (track number [0], etc) on which all the normal reproducing sync blocks are recorded; a second track (track number [1], etc) recorded with the data series TP1v, TP1a and TP2 mixed with the normal reproducing sync blocks; a third track (track number [3], etc) recorded with the data series TP2 mixed with the normal reproducing sync blocks; and a fourth track (track number [13], etc) recorded with the data series TP1v and TP1a mixed with the normal reproducing sync blocks. The numbers of sync blocks of the four tracks are listed in the following Table 1:

TABLE 1

| TRACK No. | NML | TP1v | TP1a | TP2 | TOTAL TP |
|---|---|---|---|---|---|
| 0 | 306 (= 6 × 51) | 0 | 0 | 0 | 0 |
| 1 | 186 (= 6 × 31) | 90 | 6 | 24 | 120 (= 6 × 20) |
| 3 | 282 (= 6 × 47) | 0 | 0 | 24 | 24 (= 6 × 4) |
| 13 | 210 (= 6 × 35) | 90 | 6 | 0 | 96 (= 6 × 16) |

Table 1 indicates that all the numbers of sync blocks of the normal reproducing data series NML in a single track are multiples of the least common multiple of [6]. Further, indicated are that the total numbers of sync blocks of the trick playing data series TP in a single track are also multiples of the least common multiple of [6].

Accordingly, since the rotating body rotates 30 revolutions per second, the reproduction rate of the sync blocks is 2.42 Mbps (=90×30×112×8) in the data series TP1v, 161 kbps (=6×30×112×8) in the data series TP1a, and 2.58 Mbps (=96×30×112×8) in the data series TP2.

In the case of the first transmission mode (MPEG2-TP), since 94-bytes (=188/2) are stored for each sync block, the practical packet reproduction rate is 2.03 Mbps (=90 ×30× 94×8) in the data series TP1v, 135 kbps (=6×30 ×94×8) in the data series TP1a, and 2.17 Mbps (=96×30×94×8) in the data series TP2.

Further, in the case of the second transmission mode (the maximum packet size is 140 bytes), 93.3 bytes (=149 ×2/3) are stored for each sync block. The practical packet reproduction rate is thus 2.02 Mbps (=90×30×93.3×8) in the data series TP1v, 134 kbps (=6×30× 93.3×8) in the data series TP1a, and 2.15 Mbps (=96×30×93.3×8) in the data series TP2.

On the other hand, in FIG. 8, there are three places where the data series TP1v and TP1a are recorded and one place where the data series TP2 are recorded both for each 18 tracks. The reproduction rate of the sync blocks of the normal reproducing data series NML recorded on the white portions of the respective tracks shown in FIG. 8 is as follows:

18×306−(90×3+6×3+96)=5124 (sync blocks/18 tracks) 5124×(60/18)×112×8=15.3 (Mbps)

Therefore, the maximum reproduction rate of the practical packet data in the normal reproduction is 12.84 Mbps (=5124×(60/18)×94×8) in the first transmission mode (MPEG2-TP), and 12.75 Mbps (=5124×(60/18)×93.3 ×8) in the second transmission mode (the maximum packet size is 140 bytes).

Suppose that one packet extends over two trick playing frames. Packets are reproduced in unit of frame in the trick playing. In this case, starting the reproduction from the trick playing frame in which the latter half of the divided packet is stored, is not desirable. Because the divided packet cannot be reproduced perfectly. Further, suppose that the data block is buried by invalid data in order to prevent the packet from being divided. This is also not desirable because the recording efficiency is inevitably lowered.

In contrast with this, in the present embodiment, the trick playing data series TP1va, TP1a and TP2 are arranged at a period of the trick playing frame (18 tracks). Thus, the packet ends in one track and in addition in one trick frame.

As a result, in the present embodiment, packet data will not extend over two tracks in any data series. The packet processing thus can be completed in the track. So, it is possible to use the data block neither too much nor too less. Therefore, the data recording efficiency is high, the buffer utilization efficiency is high, and the addressing is also easy.

Further, the present invention is not limited only to the above-mentioned embodiments, but various modifications can be made. For instance, it is possible to determine the data series TP1$v$ as 86 sync blocks, the data series TP1$a$ as 2 sync blocks, and the data series TP2 as 21 sync blocks. In these cases, the sum total of the numbers of the trick playing sync blocks in the 18 tracks of one trick playing frame is [264] in the three-time reproduction, and [84] in the nine-time reproduction. Both sum total numbers are multiples of the least common multiple of [6]. Further, the number of the normal reproduction sync blocks in the 18 tracks is [5160]. This is also a multiple of the least common multiple of [6].

Further, it is also possible to determine the data series TP1$v$ as 88 sync blocks, the data series TP1$a$ as two sync blocks, and the data series TP2 as 24 sync blocks. In these cases, the numbers of the sync blocks of the four tracks kinds can be listed in the following Table 2:

TABLE 2

| TRACK No. | NML | TP1v | TP1a | TP2 | TOTAL TP |
|---|---|---|---|---|---|
| 0 | 306 (= 6 × 51) | 0 | 0 | 0 | 0 |
| 1 | 192 (= 6 × 32) | 88 | 2 | 24 | 114 (= 6 × 19) |
| 3 | 282 (= 6 × 47) | 0 | 0 | 24 | 24 (= 6 × 4) |
| 13 | 216 (= 6 × 36) | 88 | 2 | 0 | 90 (= 6 × 15) |

Table 2 indicates that all the numbers of sync blocks of the normal reproducing data series NML in a single track are multiples of the least common multiple of [6]. Further, the total numbers of sync blocks of the trick playing data series TP in a single track are also multiples of the least common multiple of [6].

An embodiment of the recording apparatus for realizing the method according to the present invention will be described hereinbelow with reference to FIG. 9.

In the figure, input packet data is written in a normal data buffer memory 101. Further, the packet data is fed to a control circuit 102 that generates various control signals such as various read signals RTP1$v$, RTP1A, RTP2, and RN and a switching signal SW, etc.

An output signal of the control circuit 102 is fed to a packet head adding circuit 103 to generate packet headers. The generated packet headers are fed to the normal data buffer memory 101. The packet data and the headers both written in the memory 101 are read with the read signal RN and fed to a trick playing data forming circuit 104 and a selecting circuit 109. From the circuit 104, the data series TP1$v$, TP1$a$ and TP2 are outputted in parallel. Further, four-byte additional data (e.g., packet arrival time and the other data) are multiplexed as an additional header with the outputted data series for each packet by a packet header (additional header) adding circuit 105. The data series TP1$v$, TP1$a$ and TP2 having the additional header are written in a TP1$v$ buffer memory 106, a dedicated TP1$a$ buffer memory 107, and a dedicated TP2 buffer memory 108, respectively.

Therefore, in the case where the input packet data is of the first transmission mode, the format of the data stored in the buffer memories 106, 107 and 108 is such that four-byte additional data (additional header) are multi-plexed at the head of each 188-byte trick playing packet, as indicated by FIG. 10A. Further, in the case where the input packet data is of the second transmission mode, the format of the data stored in the buffer memories 106, 107 and 108 is such that four-byte additional data (additional header) are multiplexed at the head of the respective 140-byte trick playing packet, as indicated by FIG. 10B.

The data stored in the buffer memories 106, 107 and 108 are read with the read signals RTP1$v$, RTP1$a$ and RTP2, and then fed to the selecting circuit 109. The selecting circuit 109 selects any one of the normal reproducing packet data and the three-kind trick playing packet data in unit of packet with the switching signal SW, and feeds the selected packet data to a packet dividing circuit 110.

The packet dividing circuit 110 is a circuit for dividing the inputted packet data in unit of 96 bytes in correspondence to the 96-byte data storing area 4 of FIG. 1 in one sync block.

Therefore, when the packet data of the first transmission mode is fed, the packet dividing circuit 110 outputs 92 bytes beginning from the head of the 188-byte packet data immediately after the four-byte additional data, and then the remaining 96-byte packet data. This data output operation is repeated.

Further, when the packet data of the second transmission mode is fed, the packet dividing circuit 110 outputs: 96 byte data of four-byte additional data and 92-byte data beginning from the head of the first packet; and after that 96-byte data of the remaining 48-byte data of one packet, and the four-byte additional data and 44-byte data beginning from the head of the second packet; and thereafter outputs the remaining 96-byte data of the second packet. This data output operation is repeated.

The 96-byte data outputted by the packet dividing circuit 110 is fed to a header adding circuit 111. The circuit 111 adds three-byte header data fed by the control circuit 102 to the head of the 96-byte data and then feeds the added data to an external code forming circuit 112. The circuit 112 forms a 30-byte external code as an error correcting code. This code is required when the data and the header in unit of 99 (=96+3) bytes are inputted to 306 sync blocks for one track.

Further, the data, the header and the external code are fed from the external code forming circuit 112 to an internal code forming circuit 113. The circuit 113 forms an eight-byte parity as an internal code on the basis of the data supplied by the circuit 102. The digital signals (data, header, and external and internal codes) outputted by the circuit 113 are fed to an adding circuit 114. The circuit 114 adds the two-byte synchronous signal Sync (FIGS. 1 to 3) or the three-byte address data ID (FIGS. 1 to 3). Further, a signal recording circuit 115 multiplexes the inputted data with a preamble, sub-code, postamble, etc., recorded in the regions 26, 27, 28, 30 and 33 as shown in FIG. 4. Further, after having been modulated and amplified, the data is recorded on a recording medium (e.g., magnetic tape) 116 by a recording mechanism using a well-known rotary head (not shown).

Recording areas on the recording medium 116 are previously decided as shown in FIG. 8. The control circuit 102 has the information for the recording areas. On the basis of the information, the data stored in the buffer memories 106 to 108 are read out so that the number of the sync blocks to be recorded becomes a multiple of the least common multiple [6].

In the present embodiment, when digital signals are recorded in both the first and second digital signal transmission modes, the packets of digital signals can be recorded on a track just enough neither too much nor too less. It is thus possible to improve the availability of the buffer memories 101 and 106 to 108 for the recording signals, and also to facilitate the addressing of the recording signals.

Figure 11:
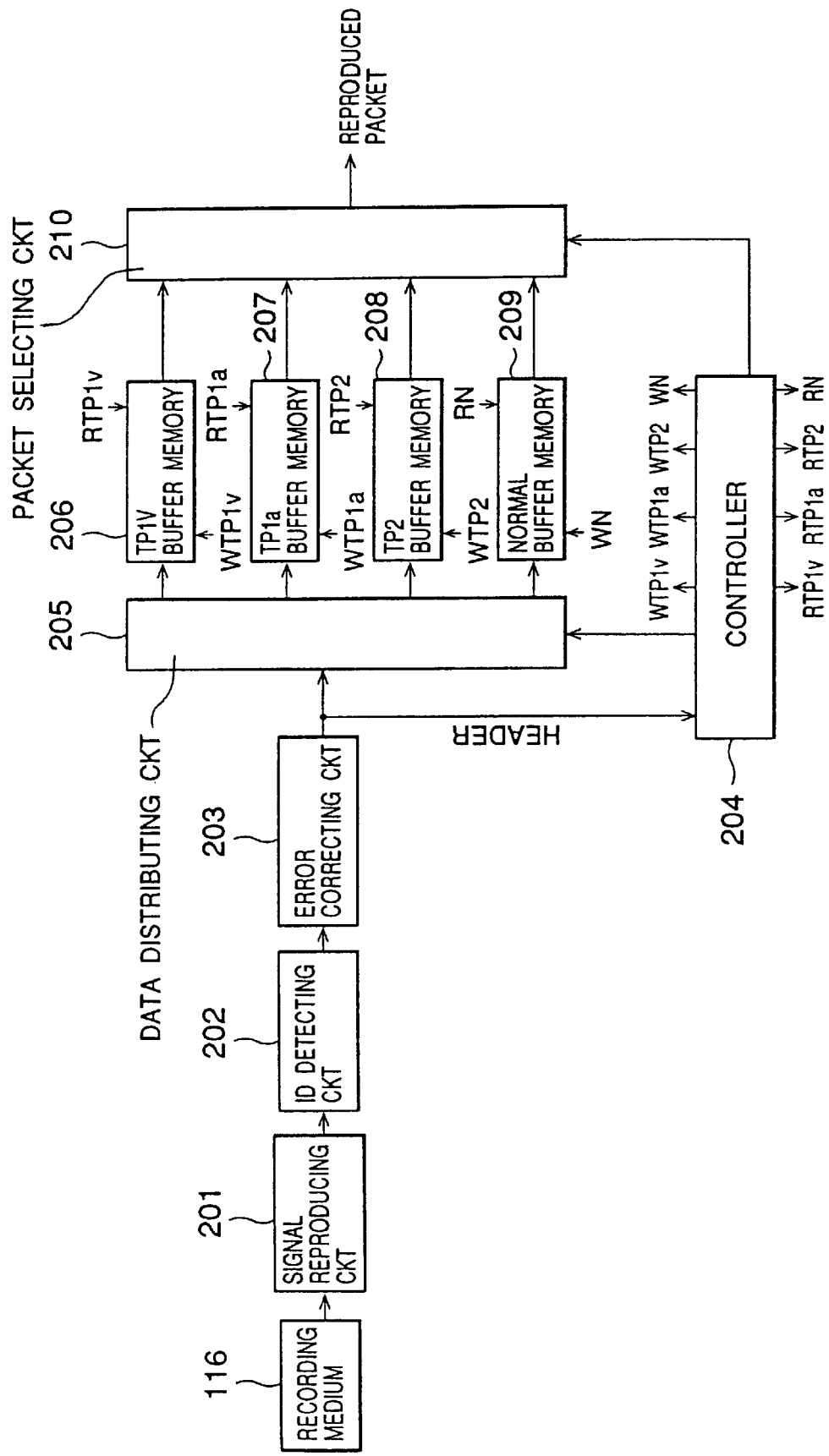
FIG. 11 is a block diagram showing an embodiment of the reproducing apparatus for realizing the method according to the present invention.

Next, a reproducing apparatus for achieving the reproduction method according to the present invention will be described hereinbelow with reference to FIG. 11. In FIG. 11, digital signals recorded on the recording medium 116 are reproduced by use of a well-known reproducing mechanism (a mechanism including a rotary head). The reproduced digital signals are fed to a control circuit 204 and a data distributing circuit 205 through a signal reproducing circuit 201, an ID detecting circuit 202, and an error correcting circuit 203.

The control circuit 204 analyzes a header of the reproduced digital signals, and feeds a control signal to the data distributing circuit 205. The circuit 204 further outputs various write control signals WTP1v, WTP1a, WTP2, and WN to a TP1v buffer memory 206, a TP1a buffer memory 207, a TP2 buffer memory 208, and a normal buffer memory 209, respectively. In addition, the circuit 204 analyzes the four-byte additional data (additional header) of the reproduced digital signals and refers to the packet arrival times included in the additional header. The circuit 204 then outputs read control signals RTP1v, RTP1a, RTP2 and RN. These control signals are required for reading the packets at the same timing on the basis of the packet arrival times.

When the inputted reproduced digital signals are trick playing data series TP1v, TP1a and TP2, the data distributing circuit 205 distributes the data to the buffer memories 206, 207 and 208 on the basis of the control signals supplied by the control circuit 204. Further, when the inputted reproduced digital signals are normal reproducing packet data, the data distributing circuit 205 inputs the data to the buffer memory 209.

Here, in the recording medium 116 of the present invention, the packets of the digital signals are recorded on the tracks just enough neither too much nor too less in any one of the two digital signal transmission modes, as already explained. It is thus possible to improve the utilization efficiency of the reproducing signal buffer memories 206 to 209 and further to facilitate the addressing thereto. Here, the packet data stored in the respective buffer memories 206 to 209 are read on the basis of the read control signals RTP1v, RTP1a, RTP2 and RN supplied by the control circuit 204, respectively, and fed to a packet selecting circuit 210.

In the normal speed reproduction, the circuit 210 selects the packet data of the normal buffer memory 209. In a reproduction of three-time speed for reproducing the data series TP1v or TP1a, the circuit 210 selects the packet data of the buffer memory 206 or 207. Further, in a reproduction of nine-time speed for reproducing the data series TP2, the circuit 210 selects the packet data of the buffer memory 208. The selection according to the reproduction speed is switched on the basis of a selection signal supplied by the control circuit 204. The selection of the buffer memory 206 or 207 is made with another selection signal supplied by the control circuit 204. The circuit 204 outputs the selection signal by analyzing the packet arrival times included in the four-byte additional data (additional header) of the reproduced digital signals.

Without being limited to only the above-mentioned embodiment, the present invention can be applied to three or more transmission modes of different packet sizes. In this case, a predetermined number of packets are recorded in such a way that they are stored in a predetermined number of data blocks together with the additional data. Further, the number of the data blocks in a single track is set to a multiple of the least common multiple R of the numbers of data blocks of the respective recording and reproducing units of a plurality of transmission modes.

Further, the above-mentioned embodiment has been explained on the assumption that the digital signals are recorded and reproduced in and from the magnetic tape. Not only this, the present invention can be applied to the recording and reproducing method such that the digital signals are recorded and reproduced in and from the tracks constructed by a plurality of sectors formed on a disk recording medium such as a magnetic disk, an optical disk, etc. In this case, the number of sectors in each track is set to a multiple of the least common multiple R of the numbers of data blocks of the respective recording and reproducing units of a plurality of transmission modes.

As described above, according to the present invention, whenever digital signals are recorded in any of the digital signal transmission modes of N kinds, the packets can be allocated to each track just enough neither too much nor too less. It is thus possible to improve the utilization efficiency of the recording medium. Further, since the packet processing can be completed in each track, it is possible to increase the utilization efficiency of both the recording and reproducing buffer memories and to facilitate the addressing to the buffer memories.

Further, according to the present invention, when the digital signals of the $p_k$ packets are to be recorded in the $d_k$ data blocks with the additional data, a counted value indicating the order of the $p_k$ packets at least as the additional data is recorded in each of the $d_k$ data block. Further, the counted value is reproduced to detect the order of the $p_k$ packets. It is thus possible to detect the divided portions of the packets without any circuit, such as a dividing circuit. Further, the counted value is provided with the initial value "0" independent of the data block numbers. It is thus possible to record any number of other data other than the digital signals in between the packets.

Further, according to the present invention, the normal reproducing data series and the trick playing data series of n kinds can be recorded and reproduced being mixed with each other in such a way that the packets to be recorded and reproduced can be completed at least T-track period. It is thus possible to improve the utilization efficiency of the recording medium even in the case of the trick playing data series, in addition to the improvement of the utilization efficiency of both the recording and reproducing buffer memories and to the facilitation of the addressing to the buffer memories.

Further, according to the present invention, the digital signals are recorded and reproduced by setting the total number of data blocks of the normal reproducing data series on any given single track of T-tracks to a multiple of the least common multiple R, even if there exists the trick playing data series. The packet of the normal reproducing data series can be completed in the track without extending over two tracks. It is thus possible to improve the utilization efficiency of the recording medium, in addition to the improvement of the utilization efficiency of both the recording and reproducing buffer memories and to the facilitation of the addressing to the buffer memories.

Further, according to the present invention, the digital signals are recorded and reproduced by setting the total number of data blocks of the normal reproducing data series in each track to a multiple of the least common multiple R. The digital signals are recorded and reproduced further by setting the total number of data blocks of the trick playing data series of the respective kinds in each track to a multiple of the least common multiple R. The packet of all the data series can be completed in the track. It is thus possible to improve the utilization efficiency of the buffer memories of all the data series, in addition to the facilitation of the addressing to the buffer memories. As a result, it is possible to record digital signals under the optimum conditions in any one of N-kind transmission modes by use of a single recording and reproducing apparatus at a high recording efficiency.

Further, according to the present invention, the packet of digital signals can be recorded efficiently in any kind of the transmission mode without extending over two tracks. It is thus possible to prevent such a problem that the packet extends over two tracks and thereby the packet cannot be reproduced when the packet is reproduced beginning from the latter half of the track in both the normal reproducing data series and the trick playing data series.

What is claimed is:

1. A method for recording and reproducing digital signals composed of a plurality of data blocks with the same format and the same size in at least first and second different digital signal transmission modes of mutually different packet sizes in and from a recording section of a predetermined length of a recording medium, comprising the steps of:

recording digital signals of $p_1$ packets and additional data on tracks of the recording medium in a unit of $d_1$ data blocks in the first digital signal transmission mode;

recording digital signals of $p_2$ packets and additional data on tracks of the recording medium in a unit of $d_2$ data blocks in the second digital signal transmission mode;

recording, in each track, data blocks of a multiple of the least common multiple R of the data block recording units $d_1$ and $d_2$ of the respective digital signals of the first and second digital signal transmission modes; and reproducing the data blocks recorded in the recording, wherein R is a natural number of 2 or more, $p_1$, $p_2$, $d_1$ and $d_2$ are natural numbers and $p_1$ and $p_2$ are different from each other.

2. A method according to claim 1, further comprising the steps of:

in the first digital signal transmission mode, recording the digital signals of one packet in a unit of two data blocks with the additional data;

in the second digital signal transmission mode, recording the digital signals of two packets in a unit of three data blocks with the additional data; and recording the data blocks of a multiple of six in each track on the recording medium.

3. A method according to claim 1, when the digital signals of the $p_1$ and $p_2$ packets are to be recorded in the $d_1$ and $d_2$ data blocks with additional data in the first and second digital signal transmission modes, respectively, further comprising the steps of:

recording a first counted value indicating the order of the $p_1$ packets at least as the additional data in each of the $d_1$ data blocks;

recording a second counted value indicating the order of the $p_2$ packets at least as the additional data in each of the $d_2$ data blocks; and reproducing the first and second counted values to detect the order of the $p_1$ and $p_2$ packets, respectively.

4. A method according to claim 3, comprising the step of recording each of the first and second counted values in a predetermined area other than an area for the address data in each data block.

5. A method according to claim 1, wherein normal reproducing data series of recorded digital signals to be reproduced at the same speed as when recorded, and n-kind trick playing data series of recorded digital signals to be reproduced at speeds different from when recorded are mixed with each other and to be recorded in data blocks of said multiple of said multiple R in each track, further comprising the steps of:

arranging and recording the n-kind trick playing data series at a specific position in a track at specific track periods;

setting a first sum total number of the data blocks of the normal reproducing data series in tracks whose number is a least common multiple T of each track period to said multiple of said multiple R; and setting a second sum total number of the data blocks of the trick playing data series for each kind in tracks whose number is the least common multiple T to said multiple of said multiple R.

6. A method according to claim 5, further comprising the steps of:

setting the first sum total to a number of a multiple of six; and;

setting the second sum total to another number of a multiple of six for each kind.

7. A method according to claim 5, further comprising the step of setting the first sum total number of the data blocks of the normal reproducing data series in any given single track of tracks whose number is the least common multiple T to a multiple of the least common multiple R for recording.

8. A method according to claim 7, further comprising the step of setting the least common multiple R to six.

9. A method according to claim 1, wherein normal reproducing data series of recorded digital signals to be reproduced at the same speed as when recorded, and n-kind trick playing data series of recorded digital signals to be reproduced at speeds different from when recorded are mixed with each other and to be recorded in data blocks of a multiple of the least common multiple R in each track, further comprising the steps of:

arranging and recording the n-kind trick playing data series at specific positions in a track at specific track periods;

setting a first sum total number of the data blocks of the normal reproducing data series in each track to a multiple of the least common multiple R; and setting a second sum total number of the data blocks of the trick playing data series for each kind in each track to a multiple of the least common multiple R.

10. A method according to claim 9, further comprising the steps of:

setting the first sum total to a number of a multiple of six; and setting the second sum total a number of a multiple of six for each kind.

11. A recording medium storing digital signals composed of a plurality of data blocks with the same format and the same size in a recording section of a predetermined length of the recording medium, comprising:

sequential recording sections; and data blocks recorded in the recording sections, each data block at least having a data storing region, wherein digital signals of $p_1$ and $p_2$ packets of at least first and second digital signal transmission modes of mutually different packet sizes, respectively, and additional data are recorded in data storing regions of $d_1$ and $d_2$ data blocks, respectively, and the data blocks of a multiple of the least common multiple R of data block recording units $d_1$ and $d_2$ of the respective digital signals of the first and second digital signal transmission modes, respectively, are recorded for each recording section, where R is a natural number of 2 or more, $p_1$, $p_2$, $d_1$ and $d_2$ are natural numbers and $p_1$ and $p_2$ are different from each other.

12. A recording medium according to claim 11, wherein digital signals of normal reproducing data series to be reproduced at the same speed as when recorded and n-kind trick playing data series to be reproduced at speeds different from when recorded are mixed in a data storing region having data blocks whose number is a multiple of the least common multiple R for each recording section, the n-kind trick playing data series are arranged and recorded at a specific fixed position in the recording section at a predetermined fixed recording section period, a sum total number of the data blocks of the normal reproducing data series in the recording sections whose number is a least common multiple T of the respective recording section periods is a multiple of the least common multiple R, and a sum total number of the data blocks of the trick playing data series for each kind in the recording sections whose number is the least common multiple T is set to a multiple of the least common multiple R for recording.

13. A method for recording digital signals composed of a plurality of data blocks with the same format and the same size in a recording section of a predetermined length of a recording medium in at least first and second different digital signal transmission modes of mutually different packet sizes in the recording medium, comprising the steps of:

recording digital signals of $p_1$ packets and additional data on tracks of the recording medium in unit of $d_1$ of data blocks in the first digital signal transmission mode;

recording digital signals of $p_2$ packets and additional data on tracks of the recording medium in a unit of $d_2$ of the data blocks in the second digital signal transmission mode:

recording digital signals of $p_1$ and $p_2$ packets on the recording medium; and recording in each track, data blocks of a multiple of the least common multiple R of the data block recording units $d_1$ and $d_2$ of the respective digital signals of the first and second digital signal transmission modes, wherein R is a natural number of 2 or more, $p_1$, $p_2$, $d_1$ and $d_2$ are natural numbers and $p_1$ and $p_2$ are different from each other.

14. A method according to claim 13, wherein normal reproducing data series of recorded digital signals to be reproduced at the same speed as when recorded, and n-kind trick playing data series of recorded digital signals to be reproduced at speeds different from when recorded are mixed with each other and to be recorded in data blocks of said multiple of the least common multiple R in each track, further comprising the steps of:

arranging and recording the n-kind trick playing data series at a specific position in a track at specific track periods;

setting a first sum total number of the data blocks of the normal reproducing data series in tracks whose number is a least common multiple T of each track period to said multiple of the least common multiple R; and setting a second sum total number of the data blocks of the trick playing data series for each kind in tracks whose number is the least common multiple T to said multiple of the least common multiple R.

15. A method for reproducing digital signals in any given k-th mode of N-kind digital signal transmission modes of mutually different packet sizes from a recording medium, comprising the steps of:

reproducing additional data recorded with digital signals of $p_k$ packets on tracks of the recording medium in unit of $d_k$ data blocks, wherein N is a natural number, of two or more k is 1 to N, and $p_k$ and $d_k$ are a natural number;

detecting arrival times of the $p_k$ packets by referring to the reproducing additional data;

generating control signals on the basis of the detected arrival times;

dividing the $p_k$ packets in a unit of a specific number of packets in response to one of the control signals; and selecting the divided $p_k$ packets in the order of the arrival times; and outputting the digital signals in the selected packet.

16. A method according to claim 15, wherein normal reproducing data series of recorded digital signals to be reproduced at the same speed as when recorded, and n-kind trick playing data series of recorded digital signals to be reproduced at speeds different from when recorded are mixed with each other and recorded in data blocks of said multiple of the least common multiple R in each track, wherein the generating step comprises the step of generating control signals corresponding to the normal reproducing data series and n-kind trick playing data series on the basis of the detected arrival times;

the dividing step comprises the step of dividing the $p_k$ packets according to the normal reproducing data series and n-kind trick playing data series; and the selecting step comprises the step of selecting the normal reproducing data series and n-kind trick playing data series in the order of the arrival times.

* * * * *